(12) United States Patent
Oki et al.

(10) Patent No.: US 8,444,875 B2
(45) Date of Patent: May 21, 2013

(54) BURNED COMPOSITE METAL OXIDE AND PROCESS FOR PRODUCING THE SAME

(75) Inventors: Kazuo Oki, Wakayama (JP); Minoru Sawai, Wakayama (JP); Hiroaki Kitayama, Wakayama (JP); Takamitsu Saito, Kawasaki (JP); Tamaki Miura, Yamato (JP); Kyoichi Watanabe, Ebina (JP)

(73) Assignee: Kao Corporation, Tokyo (JP)

( * ) Notice: Subject to any disclaimer, the term of this patent is extended or adjusted under 35 U.S.C. 154(b) by 226 days.

(21) Appl. No.: 12/746,118

(22) PCT Filed: Dec. 3, 2008

(86) PCT No.: PCT/JP2008/071957
§ 371 (c)(1),
(2), (4) Date: Jun. 3, 2010

(87) PCT Pub. No.: WO2009/081703
PCT Pub. Date: Jul. 2, 2009

(65) Prior Publication Data
US 2010/0270496 A1    Oct. 28, 2010

(30) Foreign Application Priority Data

Dec. 25, 2007 (JP) ................................. 2007-332550
Dec. 25, 2007 (JP) ................................. 2007-332592

(51) Int. Cl.
*H01M 4/131* (2010.01)
*B29B 9/12* (2006.01)

(52) U.S. Cl.
USPC .......................................... 252/182.1; 264/5

(58) Field of Classification Search
None
See application file for complete search history.

(56) References Cited

U.S. PATENT DOCUMENTS

| 6,270,924 | B1 | 8/2001 | Yamashita et al. |
| 6,270,926 | B1 | 8/2001 | Yamashita et al. |

(Continued)

FOREIGN PATENT DOCUMENTS

| JP | 10-83816 A | 3/1998 |
| JP | 10-106562 A | 4/1998 |

(Continued)

OTHER PUBLICATIONS

Material Safety Data Sheet for litium carbonate, 6 pages, last updated Nov. 2010.*

(Continued)

*Primary Examiner* — Robert S Loewe
(74) *Attorney, Agent, or Firm* — Birch, Stewart, Kolasch & Birch, LLP

(57) ABSTRACT

The burned composite metal oxide of the present invention is a burned composite metal oxide which is porous and particulate and which is obtained by subjecting a slurry comprising at least one metal oxide (a), at least one metal compound (b) and a solvent to spray granulation to obtain granules, and burning the granules, the metal oxide (a) selected from the group consisting of a transition metal oxide and an oxide of a metal belonging to 3B, 4B and 5B of a periodic table, the metal compound (b) selected from the group consisting of an alkali metal compound and an alkali earth metal compound, wherein the metal oxide (a) and the metal compound (b) are sparingly soluble in the solvent; the burning is conducted after a heat-maintaining step of heating the granules obtained by the spray granulation at a temperature in a range of ±200° C. based on the decomposition temperature of the metal compound (b); and the metal compound (b) contains at least a nonmetallic element component desorbed in the heat-maintaining step.

18 Claims, 1 Drawing Sheet

U.S. PATENT DOCUMENTS

| | | | |
|---|---|---|---|
| 2001/0026892 A1* | 10/2001 | Cho et al. | 429/224 |
| 2002/0168574 A1* | 11/2002 | Ahn et al. | 429/232 |
| 2003/0082453 A1* | 5/2003 | Numata et al. | 429/231.95 |
| 2006/0134521 A1 | 6/2006 | Shima | |
| 2007/0003836 A1* | 1/2007 | Suzuki et al. | 429/232 |
| 2011/0003200 A1* | 1/2011 | Shizuka et al. | 429/206 |

FOREIGN PATENT DOCUMENTS

| | | | |
|---|---|---|---|
| JP | 2000-72443 A | 3/2000 | |
| JP | 2002-151079 A | 5/2002 | |
| JP | 2003-48719 A | 2/2003 | |
| JP | 2004-155631 A | 6/2004 | |
| JP | 2004-161526 A | 6/2004 | |
| JP | 2005-123179 A | 5/2005 | |
| JP | 2005-158401 A | 6/2005 | |

OTHER PUBLICATIONS

Machine-generated English-language translation of JP-2005-158401, 11 pages, translation generated May 2012.*

PCT/ISA/210 International Search Report, 2012.

Notification of First Office Action dated Feb. 2, 2012. 15$ in Chinese 200880122965.0; with English translation.

Notification of Reasons for Refusal issued Oct. 2, 2012, in Japanese Patent Application No. 2007-332550, with English translation.

Notification of Reasons for Refusal issued Dec. 18, 2012, in Japanese Patent Apoiication No. 2007-532592, with English translation.

Notification of the Second Office Action issued Jan. 14, 2013, in Chinese Patent Application No. 200860122965.0, with English translation.

* cited by examiner

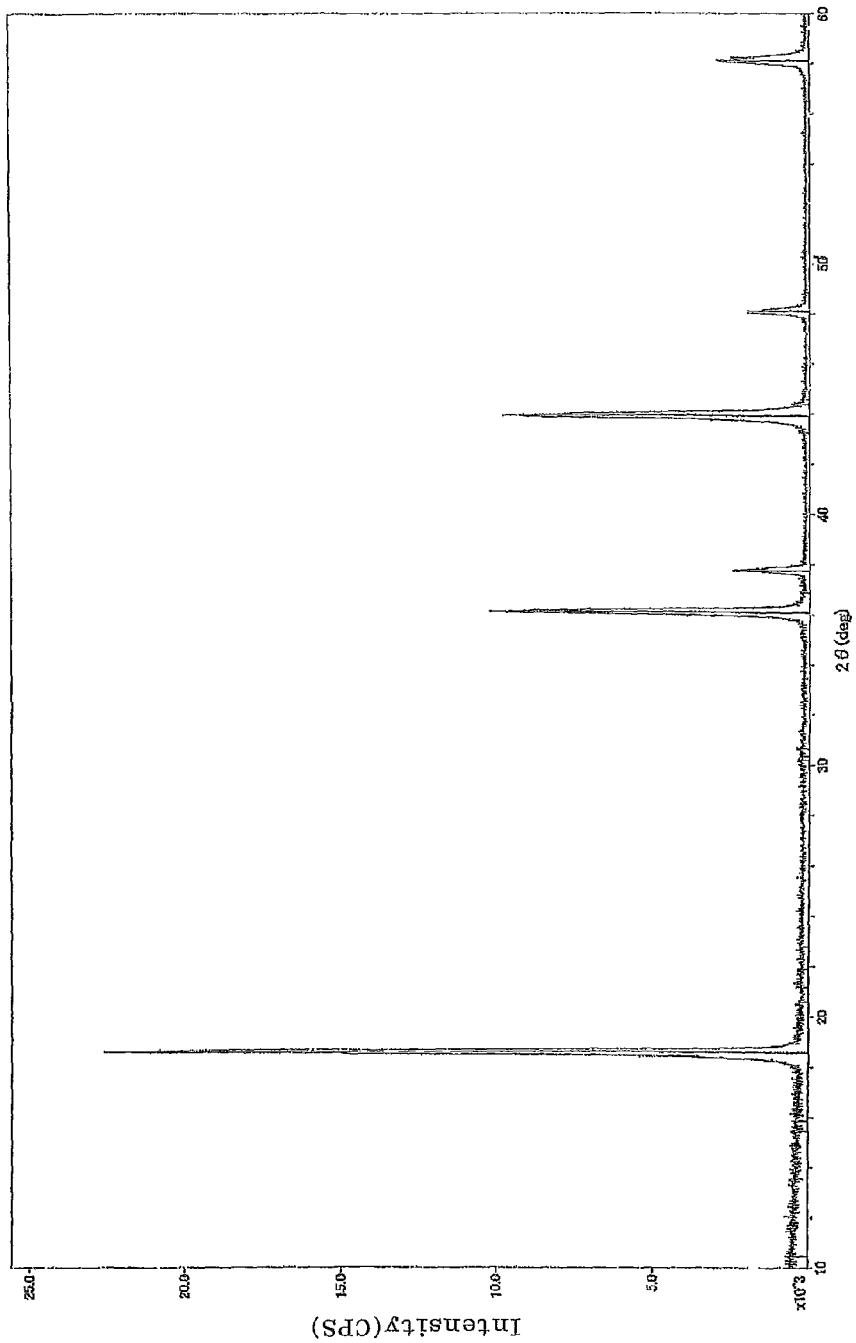

BURNED COMPOSITE METAL OXIDE AND PROCESS FOR PRODUCING THE SAME

TECHNICAL FIELD

The present invention relates to a burned composite metal oxide containing a transition metal or the like and an alkaline metal or the like, and a process for producing the burned composite metal oxide. In particular, the present invention relates to a burned composite metal oxide capable of being suitably used as a positive electrode active material of a lithium battery, and a process for producing the burned composite metal oxide.

BACKGROUND ART

A non-aqueous electrolyte secondary battery, which has features of a higher operating voltage and higher energy density than that of a conventional nickel cadmium secondary battery or the like, has been widely used as a power source of an electronic device. Lithium transition metal composite oxides represented by $LiCoO_2$, $LiNiO_2$ and $LiMn_2O_4$ or the like are used as a positive electrode active material of the non-aqueous electrolyte secondary battery.

Among these, $LiMn_2O_4$ and $LiMn_2O_4$ where Mn is partially substituted with another metal (hereinafter, may be collectively referred to as lithium manganate) have the following advantages: a raw material thereof is inexpensively and easily obtained since manganese which is a construction element is present in great quantity as a resource; and the raw material has a low load to the environment. In order to utilize the advantages, a nonaqueous electrolyte secondary battery using the lithium manganate has been conventionally used in the application of a mobile electronic device typified by a portable phone, a laptop computer, a digital camera and the like.

In recent years, in the mobile electronic device, the demand characteristics have been further increased, due to the function advancement such as the application of various functions, and use at high temperature and low temperature, or the like. The non-aqueous electrolyte secondary battery is expected to be applied to power supplies such as batteries for electric automobiles, and the battery which can follow an abrupt start and abrupt acceleration of automobiles and enables high output high-rate discharge is desired.

Therefore, there is a need for the development of lithium manganate capable of smoothly inserting and desorbing Li. A positive electrode active material having micronized primary particles made of lithium manganate is considered as one particle design for embodying the development.

For example, as described in Patent Document 1, as the positive electrode active material obtained by micronizing the primary particle made of the lithium manganate, exemplified is a positive electrode active material obtained by pulverizing lithium manganate or the like using a dry type bead mill or the like.

Patent Document 2 proposes spherical hollow particles constituted by secondary particles having a spherical surface where primary particles are gathered by techniques such as a spray thermal decomposition method. As the spray thermal decomposition method, disclosed is a method including spraying a solution (not a slurry) containing lithium nitrate and manganese nitrate into a vertical type thermal decomposition furnace to thermally decompose the solution to obtain composite oxide powders, and then annealing the powders at a predetermined temperature.

Furthermore, Patent Document 3 proposes a high-density active material obtained by mixing a spherical manganese compound with a lithium compound while maintaining the shape of the manganese compound, and heat-treating the mixture. The active material has spherical particles filled with an active material substance.

Patent Document 4 discloses a positive electrode active material obtained by a production process of an active material for a nonaqueous electrolyte secondary battery mainly containing lithium and a transition metal. The positive electrode active material is an active material for a nonaqueous electrolyte secondary battery obtained by a process including pulverizing a lithium compound and a transition metal compound in a liquid medium to set the average particle diameter of the pulverized solid compound to 2 μm or less, then spray-drying the obtained solid-liquid mixture using a spray dryer equipped with a rotary disc type atomizer or a nozzle atomizer, and further burning a powder solid obtained by drying in the presence of oxygen. Patent Document 4 describes a lithium compound which is soluble in water as a liquid medium, as a preferred example, and a process for burning a powder solid obtained by spray drying as it is, as a burning step.

Patent Document 1: Japanese Patent Application Laid-Open No. 2003-48719

Patent Document 2: Japanese Patent Application Laid-Open No. 10-83816

Patent Document 3: Japanese Patent Application Laid-Open No. 2002-151079

Patent Document 4: Japanese Patent Application Laid-Open No. 10-106562

DISCLOSURE OF THE INVENTION

Problems to be Solved by the Invention

However, the lithium manganates obtained by the conventional techniques described above are not sufficiently enhanced in function.

That is, the technique for pulverizing the lithium manganate as disclosed in Patent Document 1 may cause reduction in crystallinity depending on a pulverization form. Since the technique produces very fine particles, for example, the technique is apt to deteriorate the moldability of a positive electrode for a nonaqueous electrolyte secondary battery (hereinafter, may be merely referred to as a battery) in forming the positive electrode.

On the other hand, Patent Document 2 proposes the hollow particles constituted by the secondary particles formed by gathering of the primary particles. However, Patent Document 2 provides the hollow secondary particles without sufficient density to produce an electrode having low energy density.

Patent Document 3 improves the low energy density, and provides the high-density active material which has the spherical particles filled with the active material substance. It has been found that the high-density active material reduces a rate of Li diffusing into the active material to result in reduction in the high-rate discharge characteristics of the active material.

Furthermore, the production process described in Patent Document 4 does not form fine pores having a suitable size in a burned body obtained after burning. It has been found that Patent Document 4 produces the positive electrode active material having insufficient high-rate discharge characteristics.

Therefore, the present invention provides a burned composite metal oxide which is porous and particulate and which has excellent moldability in forming a positive electrode and serves as a positive electrode active material having excellent high-rate discharge characteristics, and a process for producing the burned composite metal oxide.

Means for Solving the Problems

The present inventors have found that a positive electrode active material capable of smoothly moving Li is obtained by the following process, and have completed the present invention. The process includes subjecting a slurry obtained by dispersing a transition metal oxide or the like and a metal compound such as an alkali metal salt in a solvent to spray granulation, then heating the obtained granules at a specific temperature, and then burning the granules to make the granules porous.

Namely, the burned composite metal oxide of the present invention is a burned composite metal oxide which is porous and particulate and which is obtained by subjecting a slurry comprising at least one metal oxide (a), at least one metal compound (b) and a solvent to spray granulation to obtain granules, and burning the granules, the metal oxide (a) selected from the group consisting of a transition metal oxide and an oxide of a metal belonging to 3B, 4B and 5B of a periodic table, the metal compound (b) selected from the group consisting of an alkali metal compound and an alkali earth metal compound, wherein the metal oxide (a) and the metal compound (b) are sparingly soluble in the solvent; the burning is conducted after a heat-maintaining step of heating the granules obtained by the spray granulation at a temperature in a range of ±200° C. based on the decomposition temperature of the metal compound (b); and the metal compound (b) contains at least a nonmetallic element component desorbed in the heat-maintaining step.

Also, the process for producing a particulate burned composite metal oxide of the present invention is a process for producing a particulate burned composite metal oxide, the process comprising: a spray granulation step of subjecting a slurry comprising at least one metal oxide (a), at least one metal compound (b) and a solvent to spray granulation to obtain granules, the metal oxide (a) selected from the group consisting of a transition metal oxide and an oxide of a metal belonging to 3B, 4B and 5B of a periodic table, the metal compound (b) selected from the group consisting of an alkali metal compound and an alkali earth metal compound; a heat-maintaining step of heating the granules at a temperature in a range of ±200° C. based on a decomposition temperature of the metal compound (b); and a burning step of burning the granules after the heat-maintaining step to obtain the porous burned composite metal oxide, wherein the metal oxide (a) and the metal compound (b) are sparingly soluble in the solvent; and the metal compound (b) contains at least a nonmetallic element component desorbed in the heat-maintaining step.

BRIEF DESCRIPTION OF THE DRAWINGS

FIG. 1 is a chart showing an X-ray diffraction result of example 1.

BEST MODE FOR CARRYING OUT THE INVENTION

A burned composite metal oxide of the present invention is obtained by the following process. The process includes subjecting a slurry containing a metal oxide (a) and a metal compound (b) which satisfy the requirements described above to spray granulation to obtain granules, carrying out a heat-maintaining step of heating the granules at a temperature in a range of ±200° C. based on a decomposition temperature of the metal compound (b), and further burning the granules. The present invention can burn the sprayed granules to provide a burned composite metal oxide which is porous and particulate (hereinafter, may be abbreviated as a "granular burned composite metal oxide"). The burned composite metal oxide is an agglomerated particle formed by agglomeration of a plurality of primary particles produced by a reaction of the metal oxide (a) with the metal compound (b) under the burning.

The average primary particle diameter of the burned composite metal oxide of the present invention tends to be determined by the average particle diameter of the metal oxide (a) as a raw material. Therefore, the primary particle diameter of the granular burned composite metal oxide of the present invention can be controlled by pulverizing the metal oxide (a) as the raw material to adjust the particle size thereof to a desired particle diameter.

In the present invention, the primary particle is a minimum unit capable of being confirmed as a particulate when being observed by an electron microscope. "The average primary particle diameter" means the number average particle diameter of the primary particle observed by the electron microscope. Specifically, various kinds of physical values in the present invention are measured by a process described in Examples.

The agglomerated particle is an aggregate of particles formed by firmer gathering of the primary particles, and means a particle which does not loose even if the metal oxide (a), the metal compound (b) or the burned composite metal oxide or the like according to the present invention is irradiated with ultrasonic waves in solvents such as water, or external forces such as a shear force are applied to the agglomerated particle by a homogenizer or the like. The average value of the particle diameters of the particles is referred to as an average aggregated particle diameter. A specific measurement method of the average aggregated particle diameter will be described later.

The average aggregated particle diameter of the burned composite metal oxide of the present invention can be controlled according to a spray condition or the like of a spray granulation process. The spray granulation is a process for spraying a raw material slurry from a spray nozzle and drying the slurry using hot air or the like to produce particles having a spherical shape and having a comparatively sharp particle size distribution. The average aggregated particle diameter of the granular burned composite metal oxide of the present invention can be controlled by controlling the size of a droplet generated by spraying.

When the burned composite metal oxide of the present invention is applied to a lithium secondary battery, the average aggregated particle diameter of the burned composite metal oxide is preferably 15 µm or less, and more preferably 10 µm or less from viewpoints of maintaining the smoothness of a coating film in forming a positive electrode of the battery and of enhancing the insertion/desorption ability of Li. The average aggregated particle diameter thereof is preferably 0.7 µm or more, and more preferably 1 µm or more from a viewpoint of reducing the amount of a binder in producing the coating film. Collectively considering the viewpoints, the average aggregated particle diameter of the burned composite metal oxide is preferably 0.7 to 15 µm, and more preferably 1 to 10 µm.

When the burned composite metal oxide of the present invention is applied to the lithium secondary battery, the BET specific surface area of the burned composite metal oxide is preferably 1 m$^2$/g or more, and more preferably 1.5 m$^2$/g from a viewpoint of the permeability of an electrolyte. From a viewpoint of reducing the amount of a binder in producing the positive electrode, the BET specific surface area is preferably 40 m$^2$/g or less, more preferably 20 m$^2$/g or less, and still more preferably 10 m$^2$/g or less. Collectively considering the viewpoints, the BET specific surface area of the burned composite metal oxide is preferably 1 to 40 m$^2$/g, more preferably 1.5 to 20 m$^2$/g, and still more preferably 1.5 to 10 m$^2$/g.

Materials which are sparingly soluble in a solvent of the slurry are used as the metal oxide (a) and the metal compound (b) contained in the slurry. This provides a solid granular burned composite metal oxide filled with a solid matter by the spray granulation. That is, when a soluble material is used for the solvent, the solvent is evaporated while the solvent moves to an outer surface layer part from a central part of a granulation particle in a process in which the droplet generated by the spray granulation is dried. In that case, a material dissolved in the solvent moves to a particle surface with the movement of the solvent, and is concentrated. As a result, a particle having a hollow central part is produced. On the other hand, when a material which is sparingly soluble in the solvent is used, it is considered that a component raw material is not concentrated on a particle surface layer, and thereby solid particles are obtained.

The granular burned composite metal oxide of the present invention has a porous structure having fine pores. In the granular burned composite metal oxide of the present invention, the metal compound (b) contains at least a nonmetallic element component desorbed in the heat-maintaining step. Thereby, it is considered that the fine pores are formed in a process in which the nonmetallic element component of the metal compound (b) is desorbed at least in the heat-maintaining step and the remainder of the metal compound (b) is reacted with the metal oxide (a). That is, it is considered that the metal compound (b) disappears in the heat-maintaining step after the spray granulation to form pores in a place occupied by the metal compound (b) (hereinafter, in the present invention, porosity means a condition of having the pores thus formed). Therefore, since the obtained pores tend to be determined by the average particle diameter of the metal compound (b), a pore diameter can be controlled by controlling the average particle diameter thereof.

Herein, "the nonmetallic element component desorbed at least in the heat-maintaining step" means a nonmetallic element component which is contained in the metal compound (b) and is desorbed with decomposition, sublimation and the like from the metal compound (b) at least in the heat-maintaining step to be described later. Examples of such a nonmetallic element component include element components such as carbon, nitrogen, hydrogen, oxygen, sulfur and chlorine contained in carbonate, nitrate, hydroxide, sulfide, chloride, acetate, oxalate or the like as a metal compound. That is, metal compounds such as the carbonate and the oxalate which cause the desorption of carbon dioxide or the like, and the hydroxide which causes the desorption of water or the like are used as the metal compound (b).

In the present invention, from a viewpoint of more greatly securing the total pore volume of the granular burned composite metal oxide, it is preferable that a material (c) other than the metal oxide (a) and the metal compound (b) is added into the slurry. The material (c), which is sparingly soluble in the slurry solvent, is not thermally decomposed in the spray granulation and but thermally decomposed (for example, oxidatively decomposed) at least by burning after the spray granulation. It is considered that the material (c) can suppress the contraction of the granules before burning the granules after carrying out the spray granulation using the slurry to greatly secure the total pore volume of the granular burned composite metal oxide. From a viewpoint of obtaining the solid granular burned composite metal oxide, the average aggregated particle diameter of the material (c) is preferably 50% or less and more preferably 40% or less of the average aggregated particle diameter of the objective granular burned composite metal oxide. From the same viewpoint, the content of the material (c) in the slurry is preferably 30% by weight or less, more preferably 25% by weight or less, and still more preferably 20% by weight or less based on the total amount of the metal oxide (a) and the metal compound (b). From viewpoints of more greatly securing the total pore volume of the granular burned composite metal oxide of the present invention and also of preventing impurities from remaining in the granular burned composite metal oxide of the present invention, the material (c) can be used as long as the material (c) is not thermally decomposed before the spray granulation but thermally decomposed at least in the burning.

Examples of the material (c) include carbons, polystyrenes (polystyrene, poly α-methylstyrene and the like), polyolefins (polyethylene, polypropylene and the like), fluorine-containing resins (polyvinylidene fluoride, polytetrafluoroethylene and the like), poly(meth)acrylic esters, poly(meth)acrylonitriles, poly(meth)acrylamides, and an organic polymer (preferably, a thermoplastic resin) such as a copolymer thereof. Furthermore, thermosetting resins such as a urethane resin, a phenol resin and an epoxy resin, thermoplastic resins or elastomers such as polyethylene and polypropylene can be used. Alternatively, a homopolymer or a copolymer of vinylidene fluoride, ethylene fluoride, acrylonitrile, ethylene oxide, propylene oxide, methyl methacrylate, polyvinyl alcohol, polyvinyl butyral and the like can be used. Furthermore, an organic short fiber or an organic polymer particle made of polyamide, acrylic, acetate, polyester, polymethylmethacrylate (PMMA) or the like can be also used. In the specification, (meth)acrylic acid means acrylic acid or methacrylic acid. (Meth)acrylonitrile and (meth)acrylamide are also the same.

As described above, the granular burned composite metal oxide is formed by using the technique of the spray granulation in the present invention. The raw material is dispersed in the solvent to form the slurry. The particle diameters of the metal oxide (a) and the metal compound (b) as the raw materials are important as factors for determining the average primary particle diameter and the pore diameter of the granular burned composite metal oxide. From a viewpoint of suppressing the change of the average particle diameters, both the metal oxide (a) and the metal compound (b) need to be sparingly soluble in the solvent. The raw material needs to be sparingly soluble in the solvent in order to form the solid granular burned composite metal oxide. "The raw material is sparingly soluble in the solvent" means that the solubility of the raw material based on 100 g of the solvent at 20° C. is 5 g or less, preferably 3 g or less, and more preferably 2 g or less. Hereinafter, the solubility at 20° C. is also merely referred to as "solubility".

The burned composite metal oxide of the present invention may have any shape as long as the particle form of the burned composite metal oxide can be obtained by the spray granulation. However, from a viewpoint of the moldability in forming the positive electrode for the battery, the shape of the burned composite metal oxide is preferably a spherical shape usually obtained by the spray granulation. Herein, the "spherical shape" does not necessarily mean only a perfect spherical shape. Conceptually, the "spherical shape" contains a spherical shape having a slightly uneven particle surface, a spherical shape wholly distorted in some degree, a partially dented or lacked spherical shape, and a spherical shape formed by the combination of some spherical particles to be agglomerated.

From a viewpoint of enhancing the energy density of the electrode, it is preferable that the porous burned composite metal oxide is solid. Herein, the term "solid" means a structure where a hollow part other than pores formed by the disappearance of the metal compound (b) or the metal compound (b) and the material (c) does not exist substantially.

The metal oxide (a) in the present invention is at least one metal oxide selected from the group consisting of a transition metal oxide and an oxide of a metal belonging to 3B, 4B and 5B of a periodic table. Examples thereof include an oxide of a transition metal belonging to 3A, 4A, 5A, 6A, 7A, 8, 1B and 2B of the periodic table, and/or an oxide of at least one metal belonging to 3B, 4B and 5B of the periodic table, or two or more composite oxides selected therefrom. Among these, those sparingly soluble in water or ethanol are particularly preferable.

In particular, it is preferable that the metal oxide (a) is an oxide of at least one metal selected from the group consisting of Mn, Fe, Co and Ni when the burned composite metal oxide is used for a material of the battery, and preferably a lithium battery.

The metal compound (b) in the present invention is at least one metal compound selected from the group consisting of an alkali metal compound and an alkali earth metal compound. Specific examples thereof include one or two or more metal compounds of carbonate, nitrate, hydroxide, sulfide or chloride, or organic low molecule carboxylates such as acetate and oxalate, of an element belonging to 1A and 2A of the periodic table. Among these, those insoluble or sparingly soluble in water or ethanol are preferable. Those in which components other than the metal oxide are not left by a heat treatment of 600° C. or less are preferable. Specifically, carbonate, nitrate and hydroxide are preferable, and those insoluble in water or ethanol are more preferable.

The burned composite metal oxide of the present invention is suitable for a functional material obtained by burning. For example, $BaTiO_3$ as a dielectric material, ferrite ($MgFe_2O_4$) as a magnetic material, $Nb_3$ as a piezoelectric device, $NaCoO_4$ as a thermal electric conversion device, $SrZrO_5$ as a solid electrolyte, $LiNbO_3$ as a laser device, $LiMn_2O_4$, $LiCoO_2$, $LiNiO_2$ and $LiFeO_2$ as a nonaqueous electrolyte secondary battery material (lithium battery material) are exemplified. Among these, the burned composite metal oxide is more suitably used for lithium manganate such as $LiM_2O_4$ as the lithium battery material. Therefore, in the present invention, it is preferable that the metal oxide (a) is an oxide of at least one metal selected from the group consisting of Mn, Fe, Co and Ni, and the metal compound (b) is a lithium salt.

The lithium manganate (in a precise sense, means a "lithium-manganese metal composite oxide") as an example of the burned composite metal oxide of the present invention is typically represented by the general formula $LiMn_{2-x}M_xO_4$ (M represents an element other than Mn, preferably $0 \leq x \leq 0.3$). The lithium manganate may contain a substitutional element other than Mn.

For a substitutional element M, x=0 is preferable from a viewpoint of enhancing initial charge/discharge characteristics, and $0<x \leq 0.3$ is preferable from a viewpoint of enhancing repeated charge/discharge characteristics (cycle characteristics).

The substitutional element M is preferably an element which is substituted with Mn of the lithium manganate, is effective for suppressing the elution of Mn into the electrolyte, and has an effect for improving battery performance and rate characteristics. Specifically, at least one element selected from the group consisting of Li, K, Ca, Mg, Ba, Fe, Ni, Zn, Co, Cr, Al, B, V, Si, Sn, P, Sb, Nb, Ta, Mo, W, F, Ti, Cu, Zr, Pb, Ga, Sc, Sr, Y, In, La, Ce, Nd, S and Bi is preferable. Among these, Mg, Al, Co, Fe, Cr, Ni, Zn, B and the like are more preferably used.

The crystal phase of the lithium manganate is preferably a spinel type. Specifically, as shown in JCPDS (Joint committee on powder diffraction standards): No. 35-782, when a diffraction strength corresponding to d=4.764±0.030 is defined as 100 for a main peak obtained by X-ray diffraction measurement, a relative diffraction strength corresponding to the other d may be equivalent. It is preferable that a relative diffraction strength corresponding to d=2.487±0.030 is 20 to 50 and a relative diffraction strength corresponding to d=2.062±0.030 is 20 to 50.

The slurry in the present invention can be prepared by a slurrying step of pulverizing the metal oxide (a) and the metal compound (b) (for example, Mn oxide (Mn source) as the metal oxide (a) and a Li salt (Li source) as the metal compound (b) when the lithium manganate is produced as the burned composite metal oxide) to a desired particle diameter by techniques such as pulverization, and mixing the pulverized material with a solvent which does not dissolve the pulverized material to form the slurry. Although the pulverization may be carried out after the metal oxide (a) and the metal compound (b) are mixed, it is preferable that the metal oxide (a) and the metal compound (b) are separately pulverized from a viewpoint of properly controlling the particle diameter thereof after pulverization. A spray granulation step of obtaining the granules from the slurry by the spray granulation, a heat-maintaining step of heating the granules at a temperature in a range of ±200° C. based on a decomposition temperature of the metal compound (b), and a burning step of burning the granules after the heat-maintaining step to obtain a porous burned composite metal oxide are carried out to produce a particulate burned composite oxide (for example, lithium manganate).

When particulate lithium manganate as an example of the present invention is produced, the element M added in order to enhance the cycle characteristics of the battery is preferably added when the Li source or the Mn source is pulverized, or slurries of the Li source and the Mn source are mixed. As the addition form of the M element, a solvent in which a salt containing the M element is dissolved may be added, the salt of the element M may be added in wet pulverization when being insoluble, or the salt of the M element may be added together with the Li source in a form of a solution or a fine particle of 0.5 μm or less.

The average primary particle diameter of the lithium manganate tends to be determined by the average aggregated particle diameter of the Mn source. That is, it is considered that the agglomerate (agglomerated particles) of the primary particles of the Mn source is sintered while taking in the Li source in a burning process and is changed to the primary particle of the lithium manganate. Therefore, the primary particle of the lithium manganate to be generated can be controlled by controlling the average aggregated particle diameter of the Mn source by the wet pulverization or the like.

As the Mn source, one or two or more of MnO, $Mn_3O_4$, $Mn_2O_3$ and $MnO_2$ is preferably used. Among these, $MnO_2$ and $Mn_2O_3$ are more suitably used.

As the Li source, lithium compounds such as lithium carbonate, lithium hydroxide, lithium oxide, lithium nitrate, lithium acetate and lithium sulfate are preferable. Among these, from viewpoints of easiness of control of the primary particle of the lithium manganate and low solubility in water as a preferred solvent, the lithium carbonate is preferably used.

In the present invention, the average primary particle diameter of the metal oxide (a) before pulverization is not particularly limited. However, from a viewpoint of easiness of pulverization to the desired particle diameter, it is preferably 0.01 to 0.5 μm, more preferably 0.01 to 0.1 μm, and still more preferably 0.01 to 0.05 μm. Furthermore, from a viewpoint of easiness of wet pulverization, the average aggregated particle diameter before pulverization is preferably 0.03 to 100 μm, and more preferably 0.03 to 50 μm.

In the present invention, the average primary particle diameter of the metal compound (b) before pulverization is not particularly limited. However, from a viewpoint of the reactivity with the metal oxide (a), it is preferably 0.01 to 10 μm. Furthermore, from a viewpoint of the reactivity with the metal oxide (a), the average aggregated particle diameter before pulverization is preferably 0.03 to 100 μm, and more preferably 0.03 to 50 μm.

In the present invention, the average aggregated particle diameter can be controlled by processes such as classification and pulverization. When the slurrying in a post-process is considered, wet classification and wet pulverization are preferable. From a viewpoint of productivity, the wet pulverization is preferable. For the wet pulverization, ball medium type mills such as a wet bead mill, a ball mill, an attritor and a vibrating mill are preferably used. When the metal compound (b) which is not dissolved in the solvent is used, the metal compound (b) may be separately wet-pulverized, or may be pulverized with the metal oxide (a). From a viewpoint of easiness of control of the respective agglomerated particle diameters, it is preferable that the metal oxide (a) and the metal compound (b) are separately wet-pulverized.

In the pulverization caused by the wet pulverization or the like, as a method for controlling the average aggregated particle diameter, a method for adjusting a pulverization time, a method for changing a particle diameter of pulverization media such as a bead, a method for adjusting pulverization energy, a combination thereof or the like can be employed.

From a viewpoint of easiness of drying of the used solvent when the solvent is removed by spray drying, the boiling point of the solvent is preferably 250° C. or less, more preferably 200° C. or less, and still more preferably 120° C. or less. From a viewpoint of handling, the boiling point thereof is still more preferably 70° C. to 120° C. As specific examples of such a solvent, N-methyl-2-pyrrolidone (NMP, boiling point: 202° C.), dimethylformamide (DMF, boiling point: 153° C.), dimethylacetamide (boiling point: 165° C.), toluene (boiling point: 110.8° C.), water (boiling point: 100° C.), methyl ethyl ketone (boiling point: 79.5° C.), ethanol (boiling point: 78.3° C.), ethyl acetate (boiling point: 76.8° C.), acetone (boiling point: 56.3° C.), tetrahydrofuran (boiling point: 66° C.) and the like are exemplified. Among these, from a viewpoint of easiness of handling, water and ethanol are preferable as the solvent, and water is more preferable.

From viewpoints of setting the suitable average primary particle diameter of the burned composite metal oxide according to the present invention, and of securing the peak pore diameter of 0.05 to 0.5 μm in the burned composite metal oxide according to the present invention, the average aggregated particle diameter of the metal oxide (a) in the slurry used after pulverization, that is, in the spray granulation step is preferably 0.03 μm to 2.5 μm, more preferably 0.05 to 2 μm, and still more preferably 0.10 to 1.8 μm. From the same viewpoint, the average primary particle diameter of the metal oxide (a) used in the spray granulation step is preferably 0.01 to 2.5 μm, more preferably 0.03 to 2 μm, and still more preferably 0.05 to 1.7 μm.

From a viewpoint of applying suitable porosity to the granular burned composite metal oxide, the average aggregated particle diameter of the metal compound (b) in the slurry is preferably 0.1 to 10 μm, more preferably 0.2 to 5 μm, and still more preferably 0.2 to 3 μm.

Therefore, from the viewpoint described above, it is preferable that both the average aggregated particle diameter of the metal oxide (a) and the average aggregated particle diameter of the metal compound (b) in the slurry are in the preferred ranges.

As a concentration in the wet pulverization, from a viewpoint of productivity, the solid content total amount of the metal oxide (a) and the metal compound (b) is preferably 1% or more by weight, more preferably 2% or more by weight, and still more preferably 5% or more by weight of the total amount of the slurry. From a viewpoint of the pulverization efficiency of the slurry, it is preferably 70% or less by weight, more preferably 50% or less by weight, and still more preferably 30% or less by weight. Collectively considering the viewpoints, as the concentration in the wet pulverization, it is preferably 1 to 70% by weight, more preferably 2 to 50% by weight, and still more preferably 5 to 30% by weight.

From a viewpoint of enhancing the pulverization efficiency in the wet pulverization, a dispersant is preferably added. When the dispersant is used, an anionic, nonionic or cationic surfactant, or polymer dispersant can be used as the dispersant. However, from a viewpoint of dispersion performance, the polymer dispersant is preferably used. From a viewpoint of highly keeping the purity of the granular burned composite metal oxide of the present invention, the polymer dispersant which is completely decomposed after burning to prevent a residual substance from remaining is more preferable.

Various compounds can be used as the polymer dispersant. However, a polycarboxylic acid polymer dispersant having a plurality of carboxyl groups in a molecule, a polyamine-based polymer dispersant having a plurality of amino groups in a molecule, a polymer dispersant having a plurality of amide groups in a molecule, and a polymer dispersant containing a plurality of polycyclic aromatic compounds in a molecule are preferable.

Examples of the polycarboxylic acid polymer dispersant include poly(meth)acrylic acid and a derivative thereof. Specific examples of the derivative include a copolymer of (meth)acrylic acid and (meth)acrylic ester, a copolymer of (meth)acrylic acid and maleic anhydride, an amidated compound and an esterified compound thereof, a copolymer of (meth)acrylic acid and maleic acid, and a comb-shaped polymer having a (meth)acrylic acid unit.

Examples of the polyamine-based polymer dispersant include polyalkyleneimine and a derivative thereof, polyallylamine and a derivative thereof, polydiallylamine and a derivative thereof, poly-N,N-dimethylaminoethyl methacrylate and a derivative thereof, and a comb-shaped polymer obtained by grafting polyester to the polyamine.

Examples of the polymer dispersant having a plurality of amide groups in a molecule include polyamide obtained by a condensation reaction and a derivative thereof, polyvinylpyrrolidone and a derivative thereof, poly-N,N-dimethylacrylamide and a derivative thereof, and a comb-shaped polymer obtained by grafting polyester and polyalkylene glycol to the polyamides.

Examples of the polymer dispersant containing a polycyclic aromatic compound include a copolymer of a vinyl monomer having a pyrene or quinacridone skeleton and various monomers.

These dispersants can be used singly or in the form of a combination of two or more. The suitable adding amount of the dispersant to be used is 0.05 to 20% by weight based on the slurry. From a viewpoint of preventing a residual substance from remaining after burning, it is more preferably 0.05 to 10% by weight.

In the present invention, the particle diameters of the metal oxide (a) and the metal compound (b) are factors for determining the average primary particle diameter and the pore diameter of the granular burned composite metal oxide. Thereby, it is preferable that the particle sizes of the metal oxide (a) and the metal compound (b) are separately adjusted. In that case, slurries respectively adjusted to a desired particle size are mixed, and the obtained slurry is subjected to the spray granulation. However, a mixer used in that case is not particularly limited. It is preferable that the slurries are mixed by using dispersers such as a paddle type agitator, a disper and a homomixer. The dispersers can mix the slurries uniformly.

Next, a production process of the burned composite metal oxide of the present invention will be described. Since the production process of the burned composite metal oxide of the present invention is a suitable process for producing the burned composite metal oxide of the present invention described above, the overlapping description will be omitted.

The production process of the burned composite metal oxide of the present invention includes: a spray granulation step of subjecting a slurry containing the metal oxide (a), the metal compound (b) and the solvent to spray granulation to obtain granules, a heat-maintaining step of heating the granules at a temperature in a range of ±200° C. based on a decomposition temperature of the metal compound (b); and a burning step of burning the granules after the heat-maintaining step to obtain the porous burned composite metal oxide. In addition, the production process has the following conditions (I) and (II).

(I) The metal oxide (a) and the metal compound (b) are sparingly soluble in the solvent.

(II) The metal compound (b) contains at least a nonmetallic element component desorbed in the heat-maintaining step.

The production process of the present invention includes the spray granulation step of subjecting the slurry to the spray granulation to obtain the granules. In the spray granulation step, atomized droplets are formed by spraying the mixed raw material slurry from the spray nozzle, and the droplets are dried. Thereby, spherical powders can be formed.

The atomized droplets are usually distinguished as follows: when the diameter of the droplets is more than 10 µm, the droplets are referred to as spray; when the diameter thereof is 10 µm or less, the droplets are referred to as mist. It is preferable that the droplets of the mist are used. That is, in the spray granulation step in the present invention, it is preferable that the slurry is sprayed so as to set the diameter of the droplets to 10 µm or less. It is more preferable that the slurry is sprayed so as to set the diameter of the droplets to 0.1 to 10 µm.

The droplets of the slurry can be formed by using a rotation disc (change of number of rotations), a pressurization nozzle (fluid pressure), a two-fluid nozzle (gas pressure), a four-fluid nozzle (gas pressure) or the like.

Among these, the two-fluid nozzle and the four-fluid nozzle as one of nozzles utilizing compressed air can spray the droplets as the mist and thus are preferable.

A drying process can be carried out by techniques such as a freeze dry, a spray dry and a spray thermal decomposition method. However, from a viewpoint of reducing the production cost, the spray dry is preferably carried out. From a viewpoint of controlling the fine pore size, for a dry temperature, a hot air temperature of an inlet of a drier is preferably between the boiling point of the solvent and 800° C., and more preferably between the boiling point of the solvent and 50° C. to 350° C.

It is considered that the metal compound (b) disappears in the heat-maintaining step after the spray granulation to generate the fine pores of the particulate burned composite metal oxide in the present invention. Since the decomposition temperature of the metal compound (b) is usually lower than the crystallization temperature of the metal oxide (a), the generated pores may disappear in a process for rapidly rising a temperature to a burning temperature.

Therefore, in the present invention, from a viewpoint of forming the desired fine pores, it is necessary to stop the rising temperature in the heat-maintaining step at about the decomposition temperature of the metal compound (b) to heat at the temperature in the range of ±200° C. based on the decomposition temperature. That is, it is necessary to carry out a heat treatment (heat-maintaining step) for holding a heating temperature in a temperature range lower than the burning temperature prior to the heat treatment at the burning temperature in the burning step in the present invention. From the same viewpoint, the upper limit temperature of the heating temperature is preferably in a range of +150° C. based on the decomposition temperature, more preferably in a range of +100° C. based on the decomposition temperature, and still more preferably in a range of +80° C. based on the decomposition temperature. From the same viewpoint, the lower limit temperature of the heating temperature is preferably in a range of −150° C. based on the decomposition temperature, more preferably in a range of −100° C. based on the decomposition temperature, and still more preferably in a range of −80° C. based on the decomposition temperature. Herein, for example, the concept of "holding the temperature in the range of ±200° C. based on the decomposition temperature of the metal compound (b)" includes both a case where the temperature is held constant or almost constant and a case where the temperature is held in a constant temperature range (including a case where a rising temperature rate is low, that is, 30° C./hour or less). Furthermore, from the same viewpoint, a holding time is preferably 0.5 to 5 hours, more preferably 0.8 to 4 hours, and still more preferably 1 to 3 hours.

A suitable average rising temperature rate until the heat-maintaining step is preferably 100 to 400° C./hour, and more preferably 150 to 300° C./hour.

The production process of the present invention includes a burning step of maintaining the heat in the granules (granulated powders, powders and the like) obtained in the spray granulation step described above and then burning the granules to obtain the porous burned composite metal oxide. It is considered that the metal oxide (a) (for example, the Mn source) can be reacted with the metal compound (b) (for example, the Li source) by burning to produce the crystal of the porous burned composite metal oxide (for example, lithium manganate). It is considered that the metal compound (b) can be decomposed to form the pores.

In the present invention, "burning" means heat treating (annealing) until the sprayed granules are sintered after the heat-maintaining step. This enhances the crystallinity of a composite metal oxide. For example, when the composite metal oxide is used for the positive electrode for the battery, the high-rate discharge characteristics are enhanced. The burning can provide a positive electrode active material cured in a porous state. Herein, the sintering means a bonding reaction caused by a pure solid phase or a partial liquid phase between solids when the aggregate of mixed mineral powders is heated, and powder particles are bonded by the bonding reaction (Kagaku Daijiten 4 (Kyoritsu Shuppan Co., Ltd., issued Oct. 15, 1981)). In the present invention, preferred is in any one state of the following items according to the burning step.
(1) The half-value width of an X-ray diffraction peak of a (111) plane belonging to the lithium manganate of the granular burned composite metal oxide is 2.5 or less.
(2) When the granular burned composite metal oxide is heated in air at 600° C. for 1 hour, the weight reduction thereof is less than 1%.

When the inner temperature of a furnace into which the sprayed granules are placed after the heat-maintaining step reaches at T° C. at an average rising temperature rate of t° C./hour, and the sprayed granules are then burned at T° C. for H hours, a suitable burning condition is that t, T and H satisfy the following contents from viewpoints of the high-rate discharge characteristics and of enhancing the crystallinity.

That is, preferably, t=200 to 800, T=650 to 1200, and $H=[4000/10^{(1+T/273)}]$ to $[204000/10^{(1+T/273)}]$, more preferably,
t=300 to 700, T=650 to 1000, and $H=[4000/10^{(1+T/273)}]$ to $[180000/10^{(1+T/273)}]$, still more preferably
t=300 to 600, T=700 to 900, and $H=[8500/10^{(1+T/273)}]$ to $[128000/10^{(1+T/273)}]$, particularly preferably
t=300 to 500, T=700 to 850, and $H=[17000/10^{(1+T/273)}]$ to $[85000/10^{(1+T/273)}]$.

It is preferable that H does not exceed 20 in view of securing productivity. It is more preferable that H does not exceed 10. It is still more preferable that H does not exceed 6.

Note that, in the burning property of the active material, it is empirically known that H is preferably enlarged when T is low, and when T is high, the burning property of the active material can be sufficiently secured even if H is small. The present inventors found that such relationship between T and H is appropriately applied by a product $[10^{(1+T/273)}] \times H$ and appropriate H to fixed T can be obtained by satisfying the appropriate range of the product.

For example, the good sintering state can be obtained by selecting H which satisfies the product=4000 to 204000 in t=200 to 800 and T=650 to 1200.

The burning step can remove gases generated in the burning step, such as air, oxygen and nitrogen, and can also burn while supplying a gas into a burning atmosphere.

The burned composite metal oxide obtained as described above has very few fixation of the particles, holds the particle diameter in the spray granulation, and can be used as the positive electrode active material. Classification or the like may be carried out by using a sieve in order to enhance the fluidity of the powders.

It is preferable that the burned composite metal oxide (the burned composite metal oxide of the present invention) obtained in the burning step is porous, and have a peak pore diameter at least in each of a range of 0.05 to 0.5 μm (preferably, 0.2 to 0.4 μm) and a range of more than 0.5 wand 10 μm or less in a pore size distribution measured by a mercury porosimeter. The fine pores of 0.05 to 0.5 μm (preferably, 0.2 to 0.4 μm), which are formed by the disappearance of the metal compound (b), or of the metal compound (b) and the material (c), are inner fine pores of the burned composite metal oxide as the agglomerated particle. When the burned composite metal oxide is the lithium manganate, and is used for the positive electrode for the battery, it is considered that Li ions enter the fine pores, and thereby the Li ions can be smoothly inserted and desorbed. It is considered that the pores being more than 0.5 μm may be formed by spaces between the burned composite metal oxides as the agglomerated particles. It is considered that the pores correspond to pores clogged with conductive auxiliary agents such as carbon black when the burned composite metal oxide is the lithium manganate and is used for the positive electrode for the battery, and the pores may correspond to pores which smoothly flow electrons and play a role of reducing the resistance of the electrode. It is considered that the fine pores can exhibit excellent high-rate discharge characteristics.

Hereinafter, a specific production process of the lithium manganate ($LiMn_2O_4$) which is the most preferable application example as the application of the granular burned composite metal oxide of the present invention will be described.

From a viewpoint of imparting suitable porosity to the obtained lithium manganate, the average aggregated particle diameter of the Li source used after pulverization, that is, in the spray granulation step is preferably 0.1 to 10 μm, and more preferably 0.1 to 5 μm. From the same viewpoint, the average primary particle diameter of the Li source used in the spray granulation step is preferably 0.01 to 10 μm, and more preferably 0.01 to 5 μm.

A mixing ratio (Li/Mn mole ratio) is preferably 0.5 to 1.1, and more preferably 0.55 to 1.02. When the substitutional element M is contained, the mole ratio of Li/(Mn+M) is preferably set to the range.

The particle size of the granules subjected to the spray granulation can be controlled by the size of the droplets and the particle diameter of raw material particles in spraying. However, the particle size of the granules is determined corresponding to the average aggregated particle diameter of the lithium manganate obtained after burning, that is, the burned composite metal oxide obtained in the burning step.

From viewpoints of maintaining the smoothness of the coating film in forming the positive electrode of the battery, and of enhancing the insertion/desorption ability of Li, the average aggregated particle diameter of the obtained lithium manganate is preferably 15 μm or less, more preferably 10 μm or less, and still more preferably 8 μm or less. From a viewpoint of reducing the amount of the binder in producing the coating film, it is preferably 0.7 μm or more, and more preferably 1 μm or more. Collectively considering the viewpoints, the average aggregated particle diameter of the lithium manganate is preferably 0.7 to 15 μm, more preferably 1 to 10 μm, and still more preferably 1 to 8 μm.

From viewpoints of suppressing the elution of Mn into the electrolyte, and of stably securing the high-rate discharge characteristics (rate characteristics), the average primary particle diameter of the lithium manganate is preferably 0.03 to 3 μm, and more preferably 0.05 to 2 μm.

From a viewpoint of the permeability of the electrolyte, the BET specific surface area of the lithium manganate, that is, the BET specific surface area of the granular burned composite metal oxide obtained in the burning step is preferably 1 $m^2/g$ or more, and more preferably 1.5 $m^2/g$ or more. From a viewpoint of reducing the amount of the binder in producing the positive electrode, it is preferably 40 $m^2/g$ or less, more preferably 20 $m^2/g$ or less, and still more preferably 10 $m^2/g$. Collectively considering the viewpoints, the BET specific surface area of the lithium manganate is preferably 1 to 40 $m^2/g$, more preferably 1.5 to 20 $m^2/g$, and still more preferably 1.5 to 10 $m^2/g$.

It is preferable that the lithium manganate, that is, the burned composite metal oxide obtained in the burning step has the peak pore diameter at least in each of the range of 0.05 to 0.5 μm (preferably, 0.2 to 0.4 μm) and the range of more than 0.5 μm and 10 μm or less in the pore size distribution measured by the mercury porosimeter.

Furthermore, from a viewpoint of the balance of porosity required for the movement of Li and the energy density, the total pore volume of the lithium manganate measured by the mercury porosimeter is preferably 0.6 to 2 ml/g, more preferably 0.6 to 1.4 ml/g, and still more preferably 0.6 to 1 ml/g.

From a viewpoint of the high-rate discharge characteristics, the strongest peak intensity of the X-ray diffraction spectrum (XRD) of the lithium manganate obtained by a method described in examples is preferably 10000 to 50000.

Since the lithium manganate obtained in the present invention is constituted by solid porous particles, the pressed density of the lithium manganate measured by a measurement method described in the examples is preferably 1.92 or more, more preferably 1.95 or more, and still more preferably 2.0 or more from a viewpoint of enhancing the energy density. From a viewpoint of securing the porosity for inducing the movement of the Li ions, it is preferably 2.4 or less, more preferably 2.3 or less, and still more preferably 2.2 or less.

The lithium manganate obtained in the present invention can be suitably used as the positive electrode active material of the lithium battery. When the lithium manganate is used as the positive electrode active material, a positive electrode is produced by applying a slurry obtained by mixing conductive materials such as a positive electrode active material and carbon black, a binder, and the solvent onto a metal foil as a current collector, and drying the slurry. The positive electrode is laminated with a negative electrode and a separator, and an electrolyte is injected to produce a lithium battery.

The lithium battery produced using the lithium manganate obtained in the present invention has excellent high-rate discharge characteristics. The high-rate discharge characteristics defined by an evaluation of battery characteristics to be described later are preferably 55% or more, and more preferably 60% or more.

When manganese oxide having a specific average aggregated particle diameter is used in the production process of the burned composite metal oxide of the present invention, it is considered that the lithium manganate having a moderate average primary particle diameter after burning is easily obtained, and Li is smoothly inserted and desorbed. Since the spray granulation gathers the fine primary particles, the coating film formability for forming the positive electrode is also enhanced to obtain high surface smoothness. When the average aggregated particle diameter of the burned composite metal oxide is particularly set to 0.7 to 15 μm, the coating film formability is further enhanced. Furthermore, the solid particles are obtained by using the raw material sparingly soluble in the solvent, and the fine pores are formed in the disappearing place of the Li source in burning. Thereby, it is considered that the electrolyte penetrates into the active material smoothly, and the insertion/desorption function of Li is easily exhibited. As a result, there can be provided the lithium manganate having excellent high-rate discharge characteristics, particularly, in the lithium battery as compared with conventional lithium manganate.

The application of the battery using the lithium manganate is not particularly limited. For example, the battery can be used for electronic devices such as a laptop PC, an electronic book player, a DVD player, a portable audio player, a video movie, a portable television and a portable phone. In addition, the battery can be used for consumer devices such as a cordless cleaner, a cordless power tool, an electromobile, a battery for a hybrid car or the like, and an auxiliary power for a fuel-cell vehicle. Among these, the battery is suitably used as a battery for an automobile particularly requiring high output.

EXAMPLES

Hereafter, examples or the like specifically showing the present invention will de described. The evaluation items in the examples or the like were measured as follows.

(1) Decomposition Temperature

Particles were subjected to thermogravimetric analysis from 30° C. to 1000° C. at a rising temperature rate of 10° C./min under an air flow by using a differential thermobalance (trade name: Thermo Plus 2, manufactured by Rigaku Corporation). The particles were obtained by a spray granulation step of subjecting a slurry containing a metal oxide (a), a metal compound (b) and a solvent to spray granulation to obtain granules. At this time, a peak top temperature of an endotherm or exothermic peak accompanied by the weight reduction of TG first observed at 100° C. or more was defined as a decomposition temperature.

(2) Average Aggregated Particle Diameter

A laser diffraction/scattering particle size distribution analyzer (trade name: LA 920, manufactured by HORIBA Ltd.) was used. In the case of the slurry, the same dispersion medium as the slurry was used, and in a case other than the case, water was used as a dispersion medium. A particle size distribution after ultrasonic wave irradiation for 1 minute was measured at a relative refractive index of 1.5 with the memory of the analyzer set to 1.

(3) Average Primary Particle Diameter

A field emission type scanning electron microscope S-4000 (manufactured by Hitachi, Ltd.) was used. Aggregated particles having an average aggregate particle diameter±(average aggregate particle diameter×0.2) of the aggregated particles composed of the aggregated primary particles were selected. The aggregated particles were observed under the above-mentioned microscope, and an SEM image was photographed at the magnification for which 50 to 100 two-dimensional SEM images (hereinafter, referred to as a primary particle image) of the primary particles exist in a microscopic field. 50 primary particle images were extracted from the photographed primary particle images, and the Feret diameter thereof was measured. The average value of 50 Feret diameters was defined as the average primary particle diameter. The Feret diameter of primary particle image of the extracted 50 Feret diameters means a distance between two parallel lines which are most apart from each other in a straight line group parallel to an optional straight line L passing the above-mentioned primary particle image (including contacting). However, the distance between two parallel lines means a length of a line segment of a straight line perpendicular to the two parallel lines cut off by the two parallel lines. When a sample was slurry, the sample with the solvent removed was observed.

(4) BET Specific Surface Area

A BET specific surface area was measured using a specific surface area measuring device (trade name: Flow Sove III 2305, manufactured by Shimadzu Corporation). When a sample was the slurry, the BET specific surface area was measured using the sample in which a solvent was removed.

(5) Peak Pore Diameter and Total Pore Volume

A pore volume was measured in a range of 0.008 μm to 200 μm using a mercury injection pore size distribution measurement device (trade name: Pore Sizer 9320, manufactured by Shimadzu Corporation). The obtained value was defined as a total pore volume. The maximum peak pore diameter observed in a range of 0.05 to 0.5 μm in peaks of a pore size distribution obtained by the measurement was defined as a fine peak pore diameter. The maximum pore diameter in a range of more than 0.5 μm was defined as an interparticle peak pore diameter.

(6) Pressed Density

About 1.5 g of a powder was added into a cylindrical metal mold having a diameter of 16 mmφ, and pressed under pressure of 1 ton. A value obtained by dividing the powder mass by the volume of the obtained molded body was defined as a pressed density.

(7) XRD Strongest Peak Intensity of Lithium Manganate

The intensity of a diffraction peak near d=4.7 in measuring a sample under conditions of output of 120 kV and 40 mA, a scanning speed of 10 degrees/min, and sampling of 0.01 degree using an X-ray diffraction device (trade name: RINT2500VPC, manufactured by Rigaku Corporation) was defined as an XRD strongest peak intensity.

(8) Production of Battery 40 parts by weight of lithium manganate, 5 parts by weight of carbon black, 5 parts by weight of a polyvinylidene fluoride (PVDF) powder, and 75 parts by weight of N-methyl-2-pyrrolidone were uniformly mixed to prepare a coating paste. The paste was uniformly coated on an aluminum foil (thickness: 20 μm) used as a current collector by a coater (a YBA type baker applicator), and dried for 10 minutes or more at 140° C. The dried body was molded to a uniform film thickness by a pressing machine, and was then cut to a predetermined size (20×15 mm²) to produce a test positive electrode. At this time, the thickness of an electrode active material layer was set to 25 μm. A test cell was produced using the test positive electrode. A metal lithium foil was cut to a predetermined size and was used for a negative electrode. Cell guard #2400 (trade name, manufactured by Cell Guard) was used for a separator. A solution of ethylene carbonate:diethyl carbonate (1:1 vol %) as $LiPF_6$ of 1 mol/L was used for an electrolyte. The test cell was assembled in a glove box under an argon atmosphere. After the test cell was assembled, the test cell was left at 25° C. for 24 hours. The high-rate discharge characteristics of the test cell were then evaluated.

(9) Evaluation of High-Rate Discharge Characteristics

The test cell was charged and discharged under a constant current at 0.2 CA under conditions of an upper limit voltage of 4.2 V and a lower limit voltage of 2.0 V. Then, a ratio of a capacity (A) to a capacity (B) was defined as high-rate discharge characteristics. (1) The capacity (A) is obtained by charging under a constant current at 0.5 CA and then discharging under a constant current at 1 CA. (2) The capacity (B) is obtained by charging under a constant current at 0.5 CA and then discharging under a constant current at 60 CA.

High-Rate Discharge Characteristics(%)=$B/A$×100

Example 1

420 g of $MnO_2$ having an average primary particle diameter of 0.03 μm and an average aggregated particle diameter of 34 μm was mixed with 2580 g of water. 7 g of POIZ 532A (trade name: manufactured by Kao Corporation) as a dispersant was added thereto. The $MnO_2$ was wet-pulverized under the following conditions by using DYNO-MILL MULTI LAB TYPE (manufactured by Shinmaru Enterprises Corporation, capacity: 0.6 L, filled with 1836 g of zirconia beads of 0.2 mm) to obtain a slurry of $MnO_2$. The slurry had an average primary particle diameter of 0.03 μm and an average aggregated particle diameter of 0.2 μm. Next, 420 g of lithium carbonate having an average primary particle diameter of 25 μm and an average aggregated particle diameter of 84 μm was mixed with 2380 g of water. 20 g of POIZ 532A (trade name, manufactured by Kao Corporation) as a dispersant was added thereto. The lithium carbonate was wet-pulverized under the following conditions by using DYNO-MILL MULTI LAB TYPE (manufactured by Shinmaru Enterprises Corporation, capacity: 0.6 L, filled with 1836 g of zirconia beads of 0.2 mm) to obtain a slurry of the lithium carbonate. The slurry had an average primary particle diameter of 0.06 μm and an average aggregated particle diameter of 0.4 μm. 100 parts by weight of the obtained slurry of $MnO_2$ and 21.8 parts by weight of the slurry of the lithium carbonate were mixed in a disper, and the resultant was spray-dried using a spray dryer (trade name: SD-1000, manufactured by Tokyo Rikakiki Co., Ltd.) under conditions of a hot air supply temperature of about 135° C. and an outlet temperature of the drier of about 80° C.

<Pulverization Conditions of $MnO_2$>

Disc Peripheral Speed: 14 m/s, Flow Rate: 160 g/min, Time: 150 minutes

<Pulverization Conditions of Lithium Carbonate>

Disc Peripheral Speed: 14 m/s, Flow Rate: 160 g/min, Time: 60 minutes

The obtained powder was heated to 450° C. at a rising temperature rate of 200° C./Hr, and was held at 450° C. for 2 hours. The powder was then heated to 800° C. at 200° C./Hr, and burned at 800° C. for 5 hours. The physical properties of the obtained powder are shown in Table 1. As a result of powder X-ray diffraction measurement, the powder corresponded to $LiMn_2O_4$ having a spinel structure described in JCPDS No. 35-782. The X-ray diffraction result of this case is shown in FIG. 1. When the powder was evaluated in the powder X-ray diffraction, a numerical value of 2θ (deg) was read in a chart of FIG. 1, and a face spacing d of a crystal was obtained according to the following formula. In the following formula, λ was the X-ray wavelength used, and was set to 1.5405 Å since a CuKα-ray was used in this example.

$$d=\lambda/2 \sin((\theta/360)\times 2\pi)$$

Example 2

A slurry of $MnO_2$ having an average primary particle diameter of 0.03 μm and an average aggregated particle diameter of 0.2 μm was obtained in the same manner as in the example 1. A slurry of lithium carbonate having an average primary particle diameter of 0.8 μm and an average aggregated particle diameter of 2.7 μm was obtained in the same manner as in the example 1 except that the pulverization time was set to 15 minutes. 100 parts by weight of the obtained slurry of $MnO_2$ and 21.8 parts by weight of the slurry of the lithium carbonate were mixed in a disper, and the resultant was then spray-dried and burned under the same condition as that of the example 1 to obtain a powder. The physical properties of the obtained powder are shown in Table 1. As a result of powder X-ray diffraction measurement, the powder corresponded to $LiMn_2O_4$ having a spinel structure described in JCPDS No. 35-782.

Example 3

A slurry of $MnO_2$ having an average aggregated particle diameter of 1.1 μm was obtained in the same manner as in the example 1 except that the pulverization time was adjusted. A slurry of lithium carbonate having an average aggregated particle diameter of 1.4 μm was obtained in the same manner as in the example 1 except that the pulverization time was adjusted. 100 parts by weight of the obtained slurry of $MnO_2$ and 21.8 parts by weight of the slurry of the lithium carbonate were mixed in a disper, and the resultant was then spray-dried and burned under the same condition as that of the example 1 to obtain a powder. The physical properties of the obtained powder are shown in Table 1. As a result of powder X-ray diffraction measurement, the powder corresponded to $LiMn_2O_4$ having a spinel structure described in JCPDS No. 35-782.

Example 4

A slurry of $MnO_2$ having an average aggregated particle diameter of 1.7 μm was obtained in the same manner as in the example 1 except that the pulverization time was adjusted. A slurry of lithium carbonate having an average aggregated particle diameter of 1.4 μm was obtained in the same manner as in the example 1 except that the pulverization time was adjusted. 100 parts by weight of the obtained slurry of $MnO_2$ and 21.8 parts by weight of the slurry of the lithium carbonate were mixed in a disper, and the resultant was then spray-dried and burned under the same condition as that of the example 1 to obtain a powder. The physical properties of the obtained powder are shown in Table 1. As a result of powder X-ray diffraction measurement, the powder corresponded to $LiMn_2O_4$ having a spinel structure described in JCPDS No. 35-782.

Example 5

The spray-dried powder obtained in the same manner as in the example 1 was heated to 300° C. at a rising temperature rate of 200° C./Hr, and was held at 300° C. for 2 hours. The powder was then heated to 800° C. at 200° C./Hr, and burned at 800° C. for 5 hours. The physical properties of the obtained powder are shown in Table 1. As a result of powder X-ray diffraction measurement, the powder corresponded to $LiMn_2O_4$ having a spinel structure described in JCPDS No. 35-782.

Example 6

The spray-dried powder obtained in the same manner as in the example 1 was heated to 600° C. at a rising temperature rate of 200° C./Hr, and was held at 600° C. for 2 hours. The powder was then heated to 800° C. at 200° C./Hr, and burned at 800° C. for 5 hours. The physical properties of the obtained powder are shown in Table 1. As a result of powder X-ray diffraction measurement, the powder corresponded to $LiMn_2O_4$ having a spinel structure described in JCPDS No. 35-782.

Example 7

100 parts by weight of a slurry of $MnO_2$ and 21.8 parts by weight of a slurry of lithium carbonate obtained in the same manner as in the example 1, and 1.38 parts by weight of acrylic particles (a material (c): a pore forming agent) having a diameter of 2 μm were mixed in a disper. A spray-dried powder was then obtained under the same condition as that of the example 1. The powder was then heated to 450° C. at a rising temperature rate of 200° C./Hr, and was held at 450° C. for 2 hours. The powder was then heated to 800° C. at 200° C./Hr, and was burned at 800° C. for 5 hours. The physical properties of the obtained powder are shown in Table 1. As a result of powder X-ray diffraction measurement, the powder corresponded to $LiMn_2O_4$ having a spinel structure described in JCPDS No. 35-782.

Example 8

A slurry of $MnO_2$ having an average aggregated particle diameter of 2.7 μm was obtained in the same manner as in the example 1 except that the pulverization time was adjusted. A slurry of lithium carbonate having an average aggregated particle diameter of 1.8 μm was obtained in the same manner as in the example 1 except that the pulverization time was adjusted. 100 parts by weight of the obtained slurry of $MnO_2$ and 21.8 parts by weight of the slurry of the lithium carbonate were mixed in a disper, and the resultant was then spray-dried and burned under the same condition as that of the example 1 to obtain a powder. The physical properties of the obtained powder are shown in Table 1. As a result of powder X-ray diffraction measurement, the powder corresponded to $LiMn_2O_4$ having a spinel structure described in JCPDS No. 35-782.

Comparative Example 1

100 parts by weight of a slurry of $MnO_2$ and 21.8 parts by weight of a slurry of lithium carbonate obtained in the example 1 were mixed in a disper. The resultant was then evaporated to dryness in a rotary evaporator. The obtained powder was pulverized in a mortar. The powder was then heated to 450° C. at a rising temperature rate of 200° C./Hr, and held at 450° C. for 2 hours. The powder was then heated to 800° C. at 200° C./Hr, and was burned at 800° C. for 5 hours. The obtained powder was dry-pulverized in a rotor speed mill (trade name: P-14, manufactured by Fritsche Co., Ltd.) to obtain a powder having an average primary particle diameter of 0.8 μm and an average aggregated particle diameter of 1.2 μm. The physical properties of the obtained powder are shown in Table 1. As a result of powder X-ray diffraction measurement, the powder corresponded to $LiMn_2O_4$ having a spinel structure described in JCPDS No. 35-782.

Comparative Example 2

4.06 parts by weight of $LiNO_3$ was dissolved in 100 parts by weight of water. Next, 30.72 parts by weight of $Mn(NO_3)_2 \cdot 6H_2O$ was added thereto and stirred to obtain an aqueous solution containing a Li source and a Mn source. The aqueous solution was spray-dried using a spray dryer (trade name: SD-1000, manufactured by Tokyo Rikakiki Co., Ltd.) under conditions of a hot air supply temperature of about 135° C. and an outlet temperature of the drier of about 80° C. The obtained powder was heated to 450° C. at a rising temperature rate of 200° C./Hr and was held at 450° C. for 2 hours. The powder was then heated to 800° C. at 200° C./Hr and burned at 800° C. for 5 hours. The physical properties of the obtained powder are shown in Table 1.

Comparative Example 3

100 parts by weight of spherical $MnO_2$ having a particle diameter of 10 μm, and 18.95 parts by weight of $Li_2CO_3$ having a particle diameter of 8 μm were mixed in 300 parts by weight of water. The obtained slurry was then evaporated to dryness in a rotary evaporator. The obtained powder was manually pulverized using an agate mortar having a diameter of 13 cm for 3 minutes. The powder was then heated to 450° C. at a rising temperature rate of 200° C./Hr, and held at 450° C. for 2 hours. The powder was then heated to 800° C. at 200° C./Hr, and was burned at 800° C. for 5 hours. The physical properties of the obtained powder are shown in Table 1. As a result of powder X-ray diffraction measurement, the powder corresponded to $LiMn_2O_4$ having a spinel structure described in JCPDS No. 35-782.

Comparative Example 4

The powder obtained by spray-drying in the example 1 was heated to 800° C. from a room temperature at a rising temperature rate of 200° C./Hr without carrying out a heat-maintaining step, and was burned at 800° C. for 5 hours. The physical properties of the obtained powder are shown in Table 1.

TABLE 1

| | | Producing condition of granular burned composite metal oxide | | | | | | | | | | |
|---|---|---|---|---|---|---|---|---|---|---|---|---|
| | | Metal oxide (a) | | | Metal compound (b) | | | | | | Heat-maintaining step | | |
| | Burning process | Type | Solubility *) (g/solvent 100 g) | Average aggregated particle diameter (μm) | Type | Solubility *) (g/solvent 100 g) | Decomposition temperature (° C.) | Average aggregated particle diameter (μm) | Solvent | Pore forming agent | Rising temperature rate (° C./Hr) | Temperature (° C.) | Time (Hr) |
| Example 1 | Spray granulation Burning process | $MnO_2$ | 0 | 0.2 | $Li_2CO_3$ | 1.31 | 479 | 0.4 | Water | Non-existence | 200 | 450 | 2 |
| Example 2 | Spray granulation burning process | $MnO_2$ | 0 | 0.2 | $Li_2CO_3$ | 1.31 | 479 | 2.7 | Water | Non-existence | 200 | 450 | 2 |
| Example 3 | Spray granulation burning process | $MnO_2$ | 0 | 1.1 | $Li_2CO_3$ | 1.31 | 479 | 1.4 | Water | Non-existence | 200 | 450 | 2 |
| Example 4 | Spray granulation burning process | $MnO_2$ | 0 | 1.7 | $Li_2CO_3$ | 1.31 | 479 | 1.4 | Water | Non-existence | 200 | 450 | 2 |
| Example 5 | Spray granulation burning process | $MnO_2$ | 0 | 0.2 | $Li_2CO_3$ | 1.31 | 479 | 0.4 | Water | Non-existence | 200 | 300 | 2 |
| Example 6 | Spray granulation burning process | $MnO_2$ | 0 | 0.2 | $Li_2CO_3$ | 1.31 | 479 | 0.4 | Water | Non-existence | 200 | 600 | 2 |
| Example 7 | Spray granulation burning process | $MnO_2$ | 0 | 0.2 | $Li_2CO_3$ | 1.31 | 479 | 0.4 | Water | Existence | 200 | 450 | 2 |
| Example 8 | Spray granulation burning process | $MnO_2$ | 0 | 2.7 | $Li_2CO_3$ | 1.31 | 479 | 1.8 | Water | Non-existence | 200 | 450 | 2 |
| Comparative Example 1 | Solid phase process Pulverized product | $MnO_2$ | 0 | 0.2 | $Li_2CO_3$ | 1.31 | 479 | 0.4 | Water | Non-existence | 200 | 450 | 2 |
| Comparative Example 2 | Solution spray granulation burning process | $Mn(NO_3)_2$ | 56.8 | — | $LiNO_3$ | 42.3 | 222 | — | Water | Non-existence | 200 | 450 | 2 |
| Comparative Example 3 | Granular Mn burning process | $MnO_2$ | 0 | 10 | $Li_2CO_3$ | 1.31 | 479 | 8 | Water | Non-existence | 200 | 450 | 2 |
| Comparative Example 4 | Spray granulation burning process | $MnO_2$ | 0 | 0.2 | $Li_2CO_3$ | 1.31 | 479 | 0.4 | Water | Non-existence | — | — | — |

TABLE 1-continued

Physical properties of granular burned composite metal oxide

| | Particle Diameter | | | | | | | | Characteristics |
|---|---|---|---|---|---|---|---|---|---|
| | Average primary particle diameter (μm) | Average aggregated particle diameter (μm) | BET specific surface area (m2/g) | Fine peak pore diameter (μm) | Interparticle peak pore diameter (μm) | Total pore volume (ml/g) | XRD strongest peak intensity (cps) | Pressed density (g/cm³) | of battery High-rate discharge characteristics (%) |
| Example 1 | 0.2 | 5.2 | 5 | 0.16 | 1.49 | 0.65 | 22500 | 2.02 | 71 |
| Example 2 | 0.2 | 5 | 4.8 | 0.19 | 1.25 | 0.77 | 22200 | 2.08 | 69 |
| Example 3 | 0.5 | 5.3 | 3.9 | 0.31 | 1.20 | 0.91 | 22400 | 2.00 | 68 |
| Example 4 | 0.5 | 5 | 3.7 | 0.32 | 1.10 | 0.82 | 22300 | 2.00 | 69 |
| Example 5 | 0.2 | 5.1 | 4.8 | 0.21 | 1.18 | 0.62 | 22300 | 2.01 | 65 |
| Example 6 | 0.3 | 5 | 4.7 | 0.20 | 1.20 | 0.87 | 22400 | 2.01 | 67 |
| Example 7 | 0.2 | 4.9 | 5.1 | 0.09 | 1.10 | 0.75 | 22400 | 2.01 | 72 |
| Example 8 | 0.6 | 4.2 | 2.8 | — | 1.00 | 0.64 | 22600 | 2.1 | 57 |
| Comparative Example 1 | 0.8 | 1.2 | 4 | — | 0.53 | 0.72 | 22000 | 2.35 | 50 |
| Comparative Example 2 | 0.2 | 10 | 3.5 | — | 1.63 | 1.5 | 22000 | 1.9 | 49 |
| Comparative Example 3 | 0.6 | 8.7 | 1 | — | 4.39 | 0.53 | 22400 | 2.44 | 47 |
| Comparative Example 4 | 0.2 | 5.2 | 4.2 | — | 2.43 | 0.59 | 22800 | 2.17 | 52 |

*): solubility at 20° C.

As shown in the results of Table 1, the particles of the examples 1 to 8 exhibited excellent high-rate discharge characteristics as compared with the particles of the comparative examples 1 to 4. Among these, the particles of the examples 1 to 7 had fine pores of the range of 0.05 to 0.5 μm. Thereby, it is considered that Li ions were smoothly moved in discharging the battery, and the excellent high-rate discharge characteristics were obtained. Since the average aggregated particle diameter of the metal oxide (a) of the particles of the examples 1 to 7 was 0.03 to 2.5 μm, it is considered that the fine pores in the examples 1 to 7 were formed as compared with the example 8 to obtain the excellent high-rate discharge characteristics as compared with the example 8. The particles of the examples 1 to 7 had the peak pore diameter (interparticle peak pore diameter) even in the range of more than 0.5 μm and 10 μm or less.

Since the spray granulation was not carried out in the comparative example 1, it is considered that the fine pores were not generated, and thus the high-rate discharge characteristics were not obtained. Since the fine pores were not vacant in the comparative example 2, it is considered that the high-rate discharge characteristics were not obtained. It is considered that the low density of the particles due to the hollow particles was one of causes of the low high-rate discharge characteristics. The particles of the comparative example 3 had high density. However, the particles had no fine pores, and thereby it is considered that the high-rate discharge characteristics were lower than those of the present invention. In the comparative example 4, the temperature was not held in the range of ±200° C. based on the decomposition temperature of the Li source. As a result, the fine pores were not obtained, and thereby it is considered that the high-rate discharge characteristics were lower than those of the present invention.

The invention claimed is:

1. A burned composite metal oxide which is porous and particulate and which is obtained by subjecting a slurry comprising at least one metal oxide (a), at least one metal compound (b) and a solvent to spray granulation to obtain granules, and burning the granules,
   wherein the metal oxide (a) is selected from the group consisting of a transition metal oxide and an oxide of a metal belonging to 3B, 4B and 5B of a periodic table,
   the metal compound (b) is selected from the group consisting of an alkali metal compound and an alkali earth metal compound,
   the metal oxide (a) and the metal compound (b) are sparingly soluble in the solvent;
   the burning is conducted after a heat-maintaining step of heating the granules obtained by the spray granulation;
   the metal compound (b) contains at least a nonmetallic element component, wherein the nonmetallic element component desorbs from the metal compound (b) during the heat-maintaining step, thereby forming pores in the metal compound (b); and the burned composite metal oxide satisfies (I)-(IV):
(I) an average aggregated particle diameter is 0.7 to 15 µm;
(II) has a peak pore diameter at least in each of a range of 0.05 to 0.5 µm and a range of 0.5 µm to 10 µm, in a pore size distribution measured by a mercury porosimeter;
(III) the BET specific surface area is 3.7 to 10 m$^2$/g; and
(IV) the total pore volume measured by the mercury porosimeter is 0.6 to 2 ml/g.

2. The burned composite metal oxide according to claim 1, wherein the metal oxide (a) is an oxide of at least one metal selected from the group consisting of Mn, Fe, Co and Ni, and the metal compound (b) is a lithium salt.

3. The burned composite metal oxide according to claim 1, wherein an average aggregated particle diameter of the metal oxide (a) is 0.03 to 2.5 µm in the slurry, and an average aggregated particle diameter of the metal compound (b) is 0.1 to 10 µm in the slurry.

4. The burned composite metal oxide according to claim 1, wherein an average aggregated particle diameter of the burned composite metal oxide is 1 to 10 µm.

5. The burned composite metal oxide according to claim 1, wherein the burned composite metal oxide has at least a peak pore diameter in a range of 0.2 to 0.4 µm in a pore size distribution measured by a mercury porosimeter.

6. A positive electrode active material for a nonaqueous electrolyte secondary battery comprising the burned composite metal oxide according to claim 1.

7. The burned composite metal oxide according to claim 1, wherein the slurry further contains a material (c) different from the metal oxide (a) and the metal compound (b); and
the material (c), which is sparingly soluble in the solvent and is not thermally decomposed in the spray granulation, is thermally decomposed at least by the subsequent burning.

8. The burned composite metal oxide according to claim 1, wherein the metal compound (b) is at least one selected from the group consisting of a carbonate, nitrate, hydroxide, sulfide, chloride, acetate and an oxalate of Li.

9. The burned composite metal oxide according to claim 1, wherein:
in the heat maintaining step the temperature is in a range of 300 to 600° C. for 2 to 5 hours,
the metal oxide (a) is selected from the group consisting of oxides of Mn, Fe, Co and Ni, and
the metal compound (b) is at least one selected from the group consisting of a carbonate, nitrate, hydroxide, sulfide, chloride, acetate and an oxalate of Li.

10. The burned composite metal oxide according to claim 1, wherein:
in the heat maintaining step the temperature is in a range of 300 to 600° C. for 1 to 5 hours.

11. A process for producing a particulate burned composite metal oxide, the process comprising:
a spray granulation step of subjecting a slurry comprising at least one metal oxide (a), at least one metal compound (b) and a solvent to spray granulation to obtain granules, the metal oxide (a) selected from the group consisting of a transition metal oxide and an oxide of a metal belonging to 3B, 4B and 5B of a periodic table, the metal compound (b) selected from the group consisting of an alkali metal compound and an alkali earth metal compound;
a heat-maintaining step of heating the granules at a temperature in a range of 300 to 600° C. for 1 to 5 hours, wherein the temperature changes by 30° C./hour or less; and
a burning step of burning the granules after the heat-maintaining step to obtain the porous burned composite metal oxide,
wherein the metal oxide (a) and the metal compound (b) are sparingly soluble in the solvent;
the metal compound (b) contains at least a nonmetallic element component desorbed in the heat-maintaining step, thereby forming pores in a place occupied by the metal compound (b); and
the burned composite metal oxide satisfies (I)-(IV):
(I) an average aggregated particle diameter is 0.7 to 15 µm;
(II) has a peak pore diameter at least in each of a range of 0.05 to 0.5 µm and a range of 0.5 µm to 10 µm, in a pore size distribution measured by a mercury porosimeter;
(III) the BET specific surface area is 3.7 to 10 m$^2$/g; and
(IV) the total pore volume measured by the mercury porosimeter is 0.6 to 2 ml/g.

12. The process for producing a burned composite metal oxide according to claim 11, wherein the metal oxide (a) is an oxide of at least one metal selected from the group consisting of Mn, Fe, Co and Ni, and the metal compound (b) is a lithium salt.

13. The process for producing a burned composite metal oxide according to claim 11, wherein an average aggregated particle diameter of the metal oxide (a) is 0.03 to 2.5 µm in the slurry, and an average aggregated particle diameter of the metal compound (b) is 0.1 to 10 µm in the slurry.

14. The process for producing a burned composite metal oxide according to claim 11, wherein an average aggregated particle diameter of the burned composite metal oxide obtained in the burning step is 1 to 10 µm.

15. The process for producing a burned composite metal oxide according to claim 11, wherein the burned composite metal oxide obtained in the burning step has at least a peak pore diameter in a range of 0.2 µm to 0.4 µm in a pore size distribution measured by a mercury porosimeter.

16. A positive electrode active material for a nonaqueous electrolyte secondary battery comprising the burned composite metal oxide made by the process according to claim 11.

17. The process for producing a burned composite metal oxide according to claim 11, wherein the slurry further contains a material (c) different from the metal oxide (a) and the metal compound (b); and
the material (c), which is sparingly soluble in the solvent and is not thermally decomposed in the spray granulation, is thermally decomposed at least by the subsequent burning.

18. The process for producing a burned composite metal oxide according to claim 11, wherein:
in the heat maintaining step the temperature is held almost constant.

* * * * *